United States Patent [19]

Kerth et al.

[11] Patent Number: 5,162,465
[45] Date of Patent: Nov. 10, 1992

[54] PREPARATION OF HOMOPOLYMERS AND COPOLYMERS OF PROPENE USING A ZIEGLER-NATTA CATALYST SYSTEM

[75] Inventors: Juergen Kerth, Carlsberg; Ralf Zolk, Hessheim; Rainer Hemmerich, Gruenstadt, all of Fed. Rep. of Germany

[73] Assignee: BASF Aktiengesellschaft, Ludwigshafen, Fed. Rep. of Germany

[21] Appl. No.: 646,493

[22] Filed: Jan. 28, 1991

Related U.S. Application Data

[63] Continuation of Ser. No. 449,342, Dec. 5, 1989, abandoned, which is a continuation of Ser. No. 243,071, Sep. 12, 1988, abandoned.

[30] Foreign Application Priority Data

Sep. 12, 1987 [DE] Fed. Rep. of Germany ....... 3730717

[51] Int. Cl.$^5$ .................... C08F 4/654; C08F 4/656; C08F 10/06
[52] U.S. Cl. .................... 526/128; 502/120; 526/129; 526/125; 526/351; 526/901
[58] Field of Search ................. 528/129; 526/128

[56] References Cited

U.S. PATENT DOCUMENTS

| | | | |
|---|---|---|---|
| 4,393,182 | 7/1983 | Goodall et al. | 526/351 |
| 4,431,568 | 2/1984 | Miya et al. | 526/129 |
| 4,711,865 | 12/1987 | Speca | 526/129 |
| 4,761,461 | 8/1988 | Jaggard et al. | 526/128 |
| 4,766,100 | 8/1988 | Best et al. | 526/129 |

FOREIGN PATENT DOCUMENTS

| | | |
|---|---|---|
| 14523 | 8/1980 | European Pat. Off. . |
| 0045977 | 2/1982 | European Pat. Off. . |
| 0014523 | 3/1983 | European Pat. Off. . |
| 0171200 | 2/1986 | European Pat. Off. . |
| 195497 | 9/1986 | European Pat. Off. . |
| 0195497 | 9/1986 | European Pat. Off. . |
| 2101609 | 1/1983 | United Kingdom . |
| 2101611 | 1/1983 | United Kingdom . |

*Primary Examiner*—Edward J. Smith
*Attorney, Agent, or Firm*—Keil & Weinkauf

[57] ABSTRACT

Polymers of propene are prepared using a Ziegler-Natta catalyst system consisting of (1) a titanium component which is based on a finely divided, shape-imparting silica gel and contains, in addition to titanium, magnesium, chlorine and a benzenecarboxylic acid derivative, (2) an aluminum component and (3) a silane component. In this process, a titanium component (1) is used which is obtained by a method in which (1.1) first (I) a carrier is prepared from (Ia) a silica gel, (Ib) an alkanol, (Ic) an organomagnesium compound and (Id) a gaseous chlorinating agent by a procedure in which (1.1.1) first (Ia) is reacted with (Ib), (1.1.2) then the mixture obtained in (1.1.1) is combined with (Ic), (1.1.3) then (Id) is passed into the mixture obtained in (1.1.2) and (I) is isolated, (1.2) thereafter a solid-phase intermediate is prepared from (I), (II) an alkanol, (III) titanium tetrachloride and (IV) a phthalic acid drivative by a procedure in which (1.2.1) first (I) is reacted with (II), (1.2.2) then (III) is introduced into the mixture resulting from (1.2.1), with the proviso that (IV) is also introduced during (1.2.1) and/or (1.2.2), (1.3) then the solid-phase product resulting from (1.2) is extracted with titanium tetrachloride and (1.4) finally the solid-phase product resulting from (1.3) is washed with a liquid hydrocarbon.

5 Claims, No Drawings

PREPARATION OF HOMOPOLYMERS AND COPOLYMERS OF PROPENE USING A ZIEGLER-NATTA CATALYST SYSTEM

This application is a continuation of Ser. No. 07/449,342, filed Dec. 5, 1989, which is a continuation of Ser. No. 07/243,071, filed Sep. 22, 1988, both now abandoned.

The present invention relates to a process for the preparation of homopolymers of propene and copolymers of propene with minor amounts of other $C_2$–$C_{12}$-$\alpha$-monoolefins, in particular $C_2$–$C_6$-$\alpha$-monoolefins, by polymerization, in particular dry pha$e polymerization, of the monomer or monomers at from 20° to 160° C., in particular from 50° to 120° C., and under from 1 to 100, in particular from 20 to 70, bar by means of a Ziegler-Natta catalyst system consisting of (1) a titanium component which is based on a finely divided, shape-imparting silica gel and contains, in addition to titanium, magnesium, chlorine and a benzenecarboxylic acid derivative, (2) an aluminum component of the formula $AlR_3$, where R is alkyl of not more than 8, in particular not more than 4, carbon atoms, and (3) a silane component of the formula $R_n^1Si(OR^2)_{4-n}$ where $R^1$ is a saturated aliphatic and/or aromatic hydrocarbon radical of not more than 16, preferably not more than 10, carbon atoms, $R^2$ is alkyl of not more than 15, preferably not more than 8, in particular not more than 4, carbon atoms and n is from 0 to 3, preferably from 0 to 2, in particular 1, with the provisos that the atomic ratio of titanium from the titanium component (1) to aluminum from the aluminum component (2) is from 1 : 10 to 1 : 800, in particular from 1 : 20 to 1 : 200, and the molar ratio of aluminum component (2) to silane component (3) is from 1 : 0.03 to 1 : 0.8, in particular from 1 : 0.05 to 1 : 0.5.

Polymerization processes of this type are known; their special feature compared with other similar processes is the specific embodiment of the catalyst system, and the processes disclosed in European Laid-Open Applications 0,014,523, 0,045,977, 0,171,200 and 0,195,497 and British Patents 2,101,609 and 2,101,611 may be mentioned as prototypes of the present case.

The specific embodiments of the catalyst systems are produced in order to achieve certain aims, such as the following:

The catalyst system should be easy to prepare and give a high yield of polymer, which should have a very high isotactic fraction. The catalyst system should also produce polymers having specific morphological properties, for example uniform particle size and/or a smaller content of very fine particles and/or high bulk density. In addition to these parameters which are important for controlling polymerization systems, working up the polymers and/or processing the latter, a low halogen content of the polymer is important, especially with regard to corrosion problems; this can be achieved by increasing the polymer yield and/or by using a catalyst system which has a very low halogen content.

Some of these aims can be achieved in the prior art only with very expensive processes or when other aims are neglected.

For example, European Laid-Open Application 0,045,977 describes a catalyst system consisting of active $MgCl_2$, $TiCl_4$ and a phthalic acid derivative. With silica gel as a shape-imparting carrier, the productivity of the catalyst system is however unsatisfactory; furthermore, the chlorine content of the polymers is comparatively high.

European Laid-Open Applications 0,014,523 and 0,171,200 and British Patents 2,101,609 and 2,101,611 describe catalyst systems whose titanium component is obtained by treating a solid, inorganic oxide with an organic magnesium compound, a Lewis base and titanium tetrachloride, where a halogenating agent which is not titanium tetrachloride and/or an organic compound of the metals boron, aluminum, silicon or tin and a boron trihalide or a halogen-containing alcohol also has to be used. In spite of an expensive and tedious preparation procedure, the productivity of the corresponding catalyst system is unsatisfactory.

European Laid-Open Application 0,195,497 describes a catalyst system whose titanium component is obtained by treating $SiO_2$ with an organic Mg compound, alcohol, a Lewis base and $TiCl_4$. This catalyst system also has a low productivity.

The known processes are thus unsatisfactory, particularly with regard to productivity and chlorine content in the polymers, isotacticity and morphology.

It is an object of the present invention to provide a titanium component which, compared with the prior art processes, has good productivity and at the same time is capable of giving polymers having a low chlorine content, high isotacticity and good morphology.

We have found that this object is achieved by a catalyst system which contains a titanium component (1) prepared in a particular manner from (I) a specific carrier which has been obtained in a defined manner from (Ia) a certain finely divided silica gel, (Ib) a certain alcohol, (Ic) a certain organomagnesium compound and (Id) a certain gaseous chlorinating agent, and (II) a certain alkanol, (III) titanium tetrachloride and (IV) a specifically selected phthalic acid derivative.

The present invention accordingly relates to a process for the preparation of homopolymers of propene and copolymers of propene with minor amounts of other $C_2$–$C_{12}$-$\alpha$-monoolefins, in particular $C_2$–$C_6$-$\alpha$-monoolefins, by polymerization, in particular dry phase polymerization of the monomer or monomers at from 20° to 160° C., in particular from 50° to 120° C., and under from 1 to 100, in particular from 20 to 70, bar using a Ziegler-Natta catalyst system consisting of (1) a titanium component which is based on a finely divided, shape-imparting silica gel and contains, in addition to titanium, magnesium, chlorine and a benzenecarboxylic acid derivative, (2) an aluminum component of the formula $AlR_3$, where R is alkyl of not more than 8, in particular not more than 4, carbon atoms, and (3) a silane component of the formula $R_n^1Si(OR^2)_{4-n}$ where $R^1$ is a saturated aliphatic and/or aromatic hydrocarbon radical of not more than 16, preferably not more than 10, carbon atoms, $R^2$ is alkyl of not more than 15, preferably not more than 8, in particular not more than 4, carbon atoms and n is from 0 to 3, preferably from 0 to 2, in particular 1, with the provisos that the atomic ratio of titanium from the titanium component (1) to aluminum from the aluminum component (2) is from 1 : 10 to 1 : 800, in particular from 1 : 20 to 1 : 200, and the molar ratio of aluminum component (2) to silane component (3) is from 1 : 0.03 to 1 : 0.8, in particular from 1 : 0.05 to 1 : 0.5.

In the novel process, the titanium component (1) used is one which is obtained by a method in which first (1.1) in a first stage (I), a carrier is prepared from (Ia) a finely divided silica gel which has a particle diameter of from 1 to 1,000, in particular from 1 to 400, μm, a pore volume of from 0.3 to 3, in particular from 1 to 2.5, cm$^3$/g and a specific surface area of from 100 to 1,000, in particular from 200 to 400, m$^2$/g and is of the formula $SiO_2 \cdot a\, Al_2O_3$, where a is from 0 to 2, in particular from 0 to 0.5, (Ib) a $C_{14}$–$C_8$-alkanol, preferably a $C_2$–$C_6$-alkanol, in particular ethanol, (Ic) an organomagnesium compound of the formula $MgR^3R^4$, where $R^3$ and $R^4$ are each $C_2$–$C_{10}$-alkyl, preferably $C_4$–$C_8$-alkyl, and (Id) a gaseous chlorinating agent of the formula ClZ, where Z is Cl or H, preferably H, by a procedure in which first (1.1.1) in a first substage, the finely divided silica gel (Ia) and the alkanol (Ib) are combined in an inert liquid hydrocarbon, in particular an alkane, with constant thorough mixing at room temperature, from 1 to 10, in particular from 2 to 3, molar parts of the alkanol (Ib) being used per 10 molar parts of the silicon of the silica gel (Ia), and the substances combined are kept at from 20° to 140° C., in particular from 60° to 90° C., for from 0.5 to 2, in particular from 1 to 1.5, hours, then (1.1.2) in a second substage, the mixture obtained in the first substage and the organomagnesium compound (Ic) are combined with constant thorough mixing at room temperature, from 1 to 10, in particular from 1.5 to 4, molar parts of the organomagnesium compound (Ic) being used per 10 molar parts of silicon of the silica gel (Ia), and the substances combined are kept at from 20° to 140° C., in particular from 60° to 90° C., for from 0.5 to 5, in particular from 1 to 2, hours, then (1.1.3) in a third substage, the gaseous chlorinating agent (Id), is passed with constant thorough mixing at from −20° to +80° C., in particular from 0° to +20° C., to the mixture obtained in the second substage, from 2 to 40, in particular from 10 to 20, molar parts of the chlorinating agent (Id) being used per molar part of the organo-magnesium compound (Ic), the entire mixture is kept at a temperature in the stated range for from 0.5 to 5 hours, in particular from 0.5 to 1 hour, and the resulting solid-phase product, i.e. the carrier (I), is isolated with removal of the liquid phase, thereafter (1.2) in a second stage, a solid-phase intermediate is prepared from (I) the carrier obtained in the first stage, (II) a $C_2$–$C_6$-alkanol, in particular ethanol, (III) titanium tetrachloride and (IV) a phthalic acid derivative of the formula

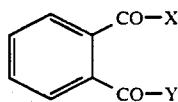

where X and Y together are oxygen or X and Y are each chlorine or $C_1$–$C_{10}$-alkoxy, preferably $C_2$–$C_8$-alkoxy, in particular butoxy, by a procedure in which first (1.2.1) in a first substage, the carrier (I) and the alkanol (II) are combined in an inert liquid hydrocarbon, in particular an alkane, with constant thorough mixing at room temperature, from 1 to 5, in particular from 1.5 to 2.5, molar parts of the alkanol (II) being used per molar part of magnesium of the carrier (I), and the substances combined are kept at from 20° to 140° C., in particular from 70° to 90° C., for from 0.5 to 5, in particular from 1 to 2, hours, then (1.2.2) in a second substage, the titanium tetrachloride (III) is introduced with constant thorough mixing at room temperature into the reaction mixture resulting from the first substage, from 2 to 20, in particular from 4 to 8, molar parts of the titanium tetrachloride (III) being used per molar part of magnesium of the carrier (I), the substances combined are kept at from 10° to 150° C., in particular from 90° to 120° C., for from 0.5 to 5, in particular from 1 to 2, hours and the resulting solid-phase intermediate is isolated with removal of the liquid phase, with the proviso that the phthalic acid derivative (IV) is introduced in the course of one or both of the substages (1.2.1) and (1.2.2), from 0.01 to 1, preferably from 0.1 to 0.4, in particular from 0.25 to 0.30, molar parts of the phthalic acid derivative (IV) being used per molar part of magnesium of the carrier (I), then (1.3) in a third stage, the solid-phase intermediate obtained in the second stage is subjected, at from 100° to 150° C., in particular from 115° to 135° C., for from 0.2 to 5, in particular from 1.5 to 3, hours, to a single-stage or multi-stage or continuous extraction with titanium tetrachloride or a mixture of titanium tetrachloride and ethylbenzene, which contains not less than 10, in particular not less than 20, % by weight of titanium tetrachloride, a total of from 10 to 1,000, preferably from 20 to 800, in particular from 150 to 300, parts by weight of the extracting agent being used per 10 parts by weight of the solid-phase intermediate obtained in the second stage, and finally (1.4) in a fourth stage, the solid-phase product formed in the third stage is washed with an inert liquid hydrocarbon, in particular an alkane, until the hydrocarbon takes up virtually no more titanium tetrachloride, and the titanium component (1) is obtained in this manner.

We have found that the novel process can be carried out particularly successfully if a catalyst system is used whose silane component (3) is of the formula $$R_n^1Si(OR^2)_{4-n}$$

where $R^1$ is phenyl or $C_1$–$C_4$-alkylphenyl, especially methyl- or ethylphenyl, $R^2$ is alkyl of not more than 4 carbon atoms, especially methyl or ethyl, and n is 1 or 2.

Regarding the novel process, the following may be stated specifically:

Provided that the defining feature is taken into account, the polymerization process is such that it can be carried out in virtually any relevant conventional technological embodiments, for example as a batchwise, periodic or, in particular, continuous suspension polymerization process or, in particular, dry phase polymerization process. The stated technological embodiments, i.e. the technological versions of the polymerization of α-monoolefins by the Ziegler-Natta method are well known from the literature and in practice, so that no further discussion is required.

For the sake of completeness, it should be stated that, in the novel process, it is also possible to regulate the molecular weights of the polymers by the relevant conventional measures, for example by means of regulators, in particular hydrogen.

Regarding the composition of the novel catalyst system, the following may be stated specifically:

(1) The finely divided silica gel (Ia) to be used for the preparation of the titanium component is in general an aluminosilicate or, in particular, a silica; it is important that it has the required properties. We have found that the commercial silica gels conventionally used for carriers and meeting the stated specification are very suitable.

The alkanol (Ib) furthermore to be used can be a commercial one; it should advantageously have relatively high purity. Examples of suitable compounds are ethanol, n-propyl alcohol, isopropyl alcohol, n-butyl alcohol, isobutyl alcohol or tert-butyl alcohol; ethanol is particularly suitable.

The organomagnesium compound (Ic) likewise to be used may be, for example, dibutylmagnesium, dihexylmagnesium or, in particular, butyloctylmagnesium.

The gaseous chlorinating agent (Id) also to be used should be as dry and pure as possible; it consists of chlorine or, in particular, hydrogen chloride.

The inert liquid hydrocarbon used as an assistant can be a hydrocarbon of the type usually combined with titanium components for catalyst systems of the Ziegler-Natta type without damaging the catalyst system or its titanium component. Examples of suitable hydrocarbons are pentanes, hexanes, heptanes, gasolines and cyclohexane.

The alkanols (II) to be used for the preparation of the titanium component (1) can also be commercial ones; they should likewise advantageously have relatively high purity. Examples of suitable compounds are ethanol, n-propyl alcohol, isopropyl alcohol, n-butyl alcohol, isobutyl alcohol and tert-butyl alcohol; ethanol is particularly suitable.

The titanium tetrachloride (III) likewise to be used for the preparation of the titanium component (1) should be one conventionally used in Ziegler-Natta catalyst systems; the ethylbenzene, which may be used as a mixture with the titanium tetrachloride, should be very pure and dry.

Furthermore, the phthalic acid derivative (IV) to be used, which is defined in detail above, may be a conventional one; it should advantageously have high purity. We have found that dibutyl phthalate is very particularly suitable for the purpose according to the invention; however, other dialkyl phthalates as well as phthalic anhydride and phthaloyl dichloride are also suitable.

The hydrocarbon to be used for the preparation of the titanium component (1) in stage (1.4) can likewise be a conventional one; it should advantageously have relatively high purity.

The preparation of the titanium component (1) is simple and can be carried out by the skilled worker without explanation. Regarding stages (1.1), (1.2) and (1.3), it is merely necessary to state that the solid resulting in each case is advantageously isolated by filtration under suction.

(2) Suitable aluminum components (2) of the stated formula are the relevant conventional ones of this formula; they are sufficiently well known from the literature and in practice that they need not be discussed in detail. Triethylaluminum may be mentioned as an outstanding typical example.

(3) The silane component (3) which completes the catalyst system is, in particular, a trialkoxy(alkyl)phenylsilane or a dialkoxydi(alkyl)phenylsilane of the stated formula. An outstanding typical example is triethoxytoluylsilane; other examples are triethoxyethylphenylsilane, dimethoxyditoluylsilane and diethoxyditoluylsilane.

The novel process permits the preparation of homopolymers and copolymers, for example copolymers of the binary or ternary type, including block copolymers, of propene with minor amounts of other $C_2$-$C_{12}$-α-monoolefins in an advantageous manner, particularly suitable α-monoolefin comonomers to be polymerized being ethene, but-1-ene, 4-methylpent-1-ene and hex-1-ene; however, other suitable examples are n-oct-1-ene, n-dec-1-ene and n-dodec-1-ene.

EXAMPLE 1

Preparation of the titanium component (1)

The procedure is carried out as follows: first (1.1) in a first stage (I), a carrier is prepared from (Ia) a finely divided silica gel which has a particle diameter of from 20 to 45 μm, a pore volume of 1.75 $cm^3/g$ and a specific surface area of 320 $m^2/g$ and is of the formula $SiO_2$, (Ib) ethanol, (Ic) butyloctylmagnesium and (Id) hydrogen chloride by a procedure in which first (1.1.1) in a first substage, the finely divided silica gel (Ia) and the ethanol (Ib) are combined in n-heptane with constant thorough mixing by stirring at room temperature, 2.5 molar parts of the ethanol (Ib) being used per 10 molar parts of silicon of the silica gel (Ia), and the substances combined are kept at 90° C., for one hour, then (1.1.2) in a second substage, the mixture obtained in the first substage and the organomagnesium compound (Ic) are combined with constant thorough mixing at room temperature, 2.5 molar parts of the organomagnesium compound (Ic) being used per 10 molar parts of silicon of the silica gel (Ia), and the substances combined are kept at 90° C. for 1.5 hours, then (1.1.3) in a third substage, the gaseous chlorinating agent (Id), is passed with constant thorough mixing by means of stirring at 10° C., into the mixture obtained in the second substage, 10 molar parts of the chlorinating agent (Id) being used per molar part of the organomagnesium compound (Ic), the entire mixture is kept at a temperature in the stated range for 0.5 hour and the resulting solid-phase product, i.e. the carrier (I), is isolated with removal of the liquid phase, thereafter (1.2) in a second stage, a solid-phase intermediate is prepared from (I) the carrier obtained in the first stage, (II) ethanol, (III) titanium tetrachloride and (IV) n-butyl phthalate by a method in which first (1.2.1) in a first substage, the carrier (I) and the ethanol (II) are combined in n-heptane with constant thorough mixing by means of stirring at room temperature, 2 molar parts of the ethanol (II) being used per molar part of magnesium of the carrier (I), and the substances combined are kept at 80° C. for 1.5 hours, then (1.2.2) in a second substage, the titanium tetrachloride (III) is introduced, with constant thorough mixing by means of stirring at room temperature, into the reaction mixture resulting from the first substage, 6 molar parts of the titanium tetrachloride (III) being used per molar part of magnesium of the carrier (I), after which the di-n-butyl phthalate is introduced, 0.30 molar part of the phthalate (IV) being used per molar part of magnesium of the carrier (I), the mixture obtained in the first substage, i.e. the substances combined, are kept at 120° C. for 2 hours with stirring, and the resulting solid-phase intermediate is isolated by filtration under suction, with removal of the liquid phase; then (1.3) in a third stage, the solid-phase intermediate obtained in the second stage is subjected, at 125° C. in the course of 2 hours, to a continuous extraction with a mixture of titanium tetrachloride and ethylbenzene, which mixture contains 10 % by weight of titanium tetrachloride, 80 parts by weight of the mixture being used per 10 parts by weight of the solid-phase intermediate obtained in the second stage, and the resulting solid-phase intermediate is than isolated by filtration, and finally (1.4) in a fourth stage, the solid-phase product obtained in the third stage is washed with n-heptane until the n-heptane takes up virtually no more titanium tetrachloride, and the titanium component (1) is obtained in this manner; it contains 3.9% by weight of titanium, 6.0% by eight of magnesium and 24% by weight of chlorine.

Polymerization

A steel autoclave having a volume of 10 1 and equipped with a stirrer is charged with 50 g of polypropylene powder, 10 millimoles of aluminumtriethyl (in the form of a 1 molar solution in n-heptane) as aluminum component (2), 1 millimole of triethoxyphenylsilane (in the form of a 1 molar solution in n-heptane) as silane component (3), 5 liters (S.T.P.) of hydrogen and finally 100 mg ( - 0.08 millimole of titanium) of the titanium component (1) described above, at 30° C. The reactor temperature is brought to 70° C. in the course of 10 minutes, and the reactor pressure is brought to 28 bar in this time by forcing in gaseous propene.

The actual polymerization is carried out with constant stirring at 70° C. and under 28 bar in the course of 2 hours, monomer consumed being replaced continuously with fresh monomer.

The productivity of the catalyst component (1), the heptane-soluble fraction (as a measure of the isotacticity) and the particle size distribution of the resulting polymer are summarized in the Table below.

EXAMPLE 2

The procedure described in Example 1 is followed, with the only exception that the same molar amount of dimethoxyditoluylsilane is used as silane component (3).

The polymerization result obtained is likewise shown in the Table below.

COMPARATIVE EXPERIMENT

Preparation of the titanium component

The procedure described in Example 1 of European Laid-Open Application 0,195,497 is followed.

The titanium component obtained contains 3.6% by weight of titanium, 4.4% by weight of magnesium and 16% by weight of chlorine.

Polymerization

This is carried out as in Example 1, except that, instead of the titanium component described there, the same molar amount of the titanium component defined above is used.

The polymerization result obtained is once again shown in the Table below.

|  | Productivity (g of PP/g of catalyst) | Heptane-soluble fraction (% by weight) | Particle size distribution (mm) | | | | | Chlorine content in the product (ppm) |
|---|---|---|---|---|---|---|---|---|
|  |  |  | <0.25 | 0.25-0.5 | 0.5-1 | 1-2 | >2 |  |
| Example 1 | 14,500 | 1.6 | 0.2 | 1.3 | 43.0 | 54.8 | 0.7 | 16.5 |
| Example 2 | 20,100 | 1.6 | 0.7 | 1.4 | 32.7 | 63.2 | 2.0 | 11.5 |
| Comparative Experiment | 3,500 | 4.0 | 3.0 | 29.8 | 54.0 | 12.2 | 1.0 | 46.0 |

As the Table shows, the catalyst component from the Comparative Experiment has a substantially lower productivity and stereospecificity than the catalyst components from the Examples according to the invention.

We claim:
1. A process for preparing a homopolymer of propene or a copolymer of propene with minor amounts of other $C_2$–$C_{12}$-α-monoolefins, which comprises polymerizing the monomer or monomers at from 20° to 160° C. under from 1 to 100 bar in the presence of a Ziegler-Natta catalyst system which contains:
   (1) a titanium component which is based on a finely divided, shape-imparting silica gel and contains, in addition to titanium magnesium, chlorine and a benzenecarboxylic acid derivative,
   (2) an aluminum component of the formula

$AlR_3$, 

where R is alkyl of not more than 8 carbon atoms, and
   (3) a silane component of the formula $R_n^1 Si(OR^2)_{4-n}$ 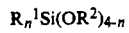

where $R^1$ is a saturated aliphatic and/or aromatic hydrocarbon of not more than 16 carbon atoms, $R^2$ is alkyl of not more than 15 carbon atoms and n is from 0 to 3, wherein the atomic ratio of titanium from the titanium component (1) to aluminum from the aluminum component (2) is from 1: 10 to 1: 800 and the molar ratio of the aluminum component (2) to the silane component (3) is from 1 : 0.03 to 1 : 0.8, and wherein the titanium component (1) is obtained by a method comprising the steps of:
   (1.1) in a first stage, preparing a carrier (I) from (Ia) a finely divided silica gel which has a particle diameter of from 1 to 1,000 μm, a pore volume of from 0.3 to 3 cm³/g and a specific surface area of from 100 to 1,000 m²/g and is of the formula $SiO_2 \cdot a\, Al_2O_3$, where a is from 0 to 2, (Ib) a $C_1$–$C_8$-alkanol, (Ic) an organomagnesium compound of the formula $MgR^3R^4$, where $R^3$ and $R^4$ are each $C_2$–$C_{10}$- alkyl, and (Id) a gaseous chlorinating agent of the formula ClZ, where Z is Cl or H, by a procedure, comprising the steps of:

(1.1.1) in a first substage, combining the finely divided silica gel (Ia) and the alkanol (Ib) in an inert liquid hydrocarbon with constant thorough mixing at room temperature, wherein from 1 to 10 molar parts of the alkanol (Ib) is used per 10 molar parts of silicon of the silica gel (Ia), and the substances combined are kept at from 20° to 140° C. for from 0.5 to 2 hours, and (1.1.2) in a second substage, combining the mixture obtained in the first substage and the organomagnesium compound (Ic) with constant thorough mixing at room temperature, wherein from 1 to 10 molar parts of the organomagnesium compound (Ic) is used per 10 molar parts of silicon of the silica gel (Ia), and the substances combined are kept at from 20° to 140° C. for from 0.5 to 5 hours, and (1.1.3) in a third substage, passing the gaseous chlorinating agent (Id) into the mixture obtained in the second substage, with constant thorough mixing at from −° to +80° C., wherein from 2 to 40 molar parts of the chlorinating agent (Id) is used per molar part of the organomagnesium compound (Ic), the entire mixture is kept at a temperature in the stated range for from 0.5 to 5 hours, and the resulting solid-phase product or carrier (I), is isolated with removal of the liquid phase, (1.2) in a second stage, preparing a solid-phase intermediate from (I) the carrier obtained in the first stage, (II) a $C_2$–$C_8$-alkanol, (III) titanium tetrachloride and (IV) a phthalic acid derivative of the formula

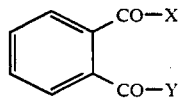

where X and Y together are oxygen or X and Y are each chlorine or $C_1$–$C_{10}$-alkoxy, by a procedure comprising:

(1.2.1) in a first substage, combining the carrier (I) and the alkanol (II) in an inert liquid hydrocarbon, with constant thorough mixing at room temperature, wherein from 1 to 5 molar parts of the alkanol (II) is used per molar part of magnesium of the carrier (I), and the substances combined are kept at from 20° to 140° C. for from 0.5 to 5 hours, and (1.2.2) in a second substage, introducing the titanium tetrachloride (III) with constant thorough mixing at room temperature, into the reaction mixture resulting from the first stage, wherein from 2 to 20 molar parts of the titanium tetrachloride (III) is used per molar part of magnesium of the carrier (I), the substances combined are kept at from 10° to 150° C. for from 0.5 to 5 hours and the resulting solid-phase intermediate is isolated with removal of the liquid phase, and wherein the phthalic acid derivative (IV) is introduced in one or both of the substages (1.2.1) and (1.2.2), from 0.01 to 1 molar part of the phthalic acid derivative (IV) is used per molar part of magnesium of the carrier (I), (1.3) in a third stage, subjecting the solid-phase intermediate obtained in the second stage, at from 100° to 150° C. in the course of from 0.2 to 5 hours, to a single-stage or multi-stage or continuous extraction with titanium tetrachloride or a mixture of titanium tetrachloride and ethylbenzene, which mixture contains not less than 10% by weight of titanium tetrachloride, and a total of from 10 to 1,000 parts by weight of the extracting agent is used per 10 parts by weight of the solid-phase intermediate obtained in the second stage, and (1.4) in a fourth stage, washing the solid-phase product formed in the third stage with an inert liquid hydrocarbon until the hydrocarbon takes up virtually no more titanium tetrachloride.

2. The process of claim 1 wherein a catalyst system is used whose silane component (3) is of the formula

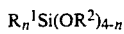

$R_n^1 Si(OR^2)_{4-n}$ where $R^1$ is phenyl or $C_1$–$C_4$-alkylphenyl, $R^2$ is alkyl of not more than 4 carbon atoms and n is 1 or 2.

3. The process of claim 2 wherein a catalyst system is used whose silane component (3) is of the formula

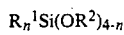

$R_n^1 Si(OR^2)_{4-n}$ where $R^1$ is methyl- or ethylphenyl, $R^2$ is methyl or ethyl and n is 1 or 2.

4. The process of claim 1, wherein the silane component is a trialkoxy (alkyl) phenylsilane, or a dialkoxydi(alkyl)-phenylsilane.

5. The process of claim 4, wherein the silane component is triethoxytoluylsilane.

* * * * *

UNITED STATES PATENT AND TRADEMARK OFFICE
CERTIFICATE OF CORRECTION

PATENT NO. : 5,162,465

DATED : Nov. 10, 1992

INVENTOR(S) : KERTH et al.

It is certified that error appears in the above-identified patent and that said Letters Patent is hereby corrected as shown below:

```
In the Claims:
  Claim 1; Column 8; Line 40
                         "titanium magnesium" should read
     -- titanium, magnesium --
  Claim 1; Column 9; Line 25
                         "-° to +80°C." should read
     -- -20 to + 80°C. --
  Claim 1; Column 10;Line 12
                              after "phase" and  "and wherein"
  Claim 1; Column 10; Line 14-15
     Please continue the paragraph in line 14, rather than  starting
        a new line with line 15, therefore reading:
               --substages (1.2.1) and (1.2.2), from 0.01 --
```

Signed and Sealed this

Seventh Day of December, 1993

*Attest:*

BRUCE LEHMAN

*Attesting Officer*   Commissioner of Patents and Trademarks